Dec. 26, 1950 N. MONSARRAT 2,535,590
FLUID CHAMBER CONNECTING VALVE FOR PRESSING
MACHINES AND THE LIKE
Filed Oct. 15, 1946 3 Sheets-Sheet 3

INVENTOR.
Nicholas Monsarrat
BY
Thomas A. Lenckes
Attorney

Patented Dec. 26, 1950

2,535,590

UNITED STATES PATENT OFFICE 2,535,590

FLUID CHAMBER CONNECTING VALVE FOR PRESSING MACHINES AND THE LIKE

Nicholas Monsarrat, Seekonk, Mass., assignor to Pantex Manufacturing Corporation, Central Falls, R. I., a corporation of Delaware Application October 15, 1946, Serial No. 703,331

23 Claims. (Cl. 251—134)

My invention relates to improvements in valve structures adapted for use for connecting two adjacent fluid chambers separated by a partition wall from each other, with the fluid in the outer chamber being under sufficient pressure to flow into said inner chamber. Such a valve structure is particularly useful in connecting the steam heating chamber to the steam spray chamber of the pressing member, either the head or buck of a garment pressing machine, or for connecting the steam inlet chamber to the steam outlet or suction producing chamber in a vacuum or suction valve for withdrawing steam from the buck of the type shown in Patent No. 2,043,027 issued June 2, 1936, to H. G. Beede. A comparison of the valve structure shown in these drawings with the valve structure shown in the Beede patent illustrates how my improved combination valve structure thereof simplifies the structure of such a suction valve.

An object of my invention is to provide a valve structure of this type having fewer wearable parts and requiring fewer machining operations in its manufacture than former types.

A further object of my invention is to provide a valve structure comprising a suitable casing and replaceable valve elements which may be renewed entirely from one side and are removable entirely on the loosening of a single screw or other single connecting means.

A further object of my invention is to provide a valve casing for my valve assembly having a cylindrical inner end, having an externally threaded portion, so that the valve may be inserted through a threaded hole in the outer chamber and extend through a hole in the partition wall to the inner chamber, and in my preferred embodiment said cylindrical end comprises an extension of the single valve chamber employed for holding the various parts thereof.

A further object of my invention is, therefore, to provide an assembly unit replaceable through single aligned holes in the chambers and so attachable thereto, and in which the parts thereof may be replaced on the unloosening of a single connecting member.

A further object of invention relates to my improved structure of combination valve and elongated valve stem insertable within the outlet steam chamber of the casing separated from the inlet chamber thereof by a central annular shoulder with the elongated stem extending outwardly through the open end of the casing and with the stem integral with the valve for the easy removal of the valve.

A further feature of my invention relates to the structure of unitary valve seat and elongated gland in which the valve stem may slide, this unit being readily insertable against the central shoulder for assembly purposes and readily removable with the valve stem and its sealing spring and protecting cap on unloosening of the turning nut which holds the assembly in position.

A further feature of the improved embodiment of my invention is that I provide an elongated hollow cap containing a washer in its base to cover the outer end of the valve stem and gland and resides in an opposing sealing structure comprising a sealing seat in the outer end of the gland adapted to abut a washer in the outer end of the hollow cap so that the washer may abut against the gland seat to prevent leakage when the valve is opened, with the spring means functioning in the opposite direction to retain the valve seat integral with the stem against its valve seat formed by the inner end of the gland member when in closed position, thereby providing a novel structure including oppositely disposed leakage seals, one functioning when the valve is closed and the other functioning when the valve is open.

Further features of my invention relate to additional improvements in the various parts thereof such as the means I employ comprising a toggle in my preferred embodiment which on further actuation thereof applies greater sealing pressure, the strainer I preferably employ in the inlet chamber, the drain plug I preferably employ in the inlet chamber, and means I provide for adjustment of the actuating means, and various other details of structure of the various parts thereof.

These and such other objects of my invention as may hereinafter appear will be best understood from a description of the accompanying drawings illustrating embodiments thereof.

In the drawings, wherein like characters of reference generally indicate like parts throughout, 20 and 20' generally indicate embodiments of my improved valve structure for connecting two adjacent fluid chambers 22 and 24, separated by a partition wall 26 from each other, with the fluid in the high pressure chamber 22 being under sufficient pressure to flow into said low pressure chamber 24, with said high pressure chamber 22 having the hole 28 in its outer wall aligned with the threaded hole 30 in the partition wall. In the embodiments shown in Figs. 1 and 2 and 10 and 11, my invention is employed for connecting the steam heating chamber 22 to the steam spray chamber 24 of a pressing member such as the buck or head of a garment pressing machine, with the respective aligned holes 28 and 30 being in the outer wall of the steam heating chamber 22 and in the partition wall 26 separating said steam heating chamber 22 from the steam spray chamber 24.

In all embodiments, my improved valve structure 20 or 20' comprises a hollow valve casing 32 having a closed inner end 34 and an open outer end 36 and a center bore 38 constricted substantially centrally thereof to provide a center annular shoulder 40, providing an inlet chamber 42 between said shoulder 40 and closed inner end 34, and an outlet chamber 44 between said central shoulder 40 and open outer end 36.

In all the embodiments shown, the outer end 36 is internally threaded as at 46 to receive the valve nut 48, later to be described, although other means than the valve nut may be provided to retain the valve assembly in position. I may, if desired, provide a cylindrical perforated strainer 50 which may be removably mounted in said inlet chamber 42 as shown to strain the steam coming into said inlet chamber.

As stated, a main feature of my invention comprises the fact that due to the structure of the individual parts I provide a valve assembly 52 insertable and removable through the open outer end 36 of said casing 32. I will first describe the structure of the various parts of the preferred embodiment of this assembly as shown in Figs. 1–9 and then describe how the parts in my alternative construction shown in Figs. 10–16 differ therefrom. In all embodiments I provide the spring means comprising the coil spring 54 abutting the inner end 34 of said casing. In all embodiments I provide a spring centering and protecting cap 56 overlying said spring means.

In the embodiment shown in Figs. 10–16, the spring centering and protective cap 56' covers the outer end of said spring means 54 attached to the combination valve and valve stem 57 in a manner later to be described.

In all embodiments I employ a valve disc 58 having its inner end abutting said spring means and having a preferably integral valve stem 57 preferably having the centrally enlarged portion 60 preferably having diametrically opposed flattened edges 62 slidable through said center shoulder 40 and an integral stem portion 64 projecting a substantial distance outwardly through the open outer end 36 of said casing.

Another feature of my invention comprises the fact that I provide as part of said removable assembly, if desired, a hollow combination gland and valve seat member 66 having an inner end or valve seat 68, having an exterior sealing portion 70 abutting or permanently secured to said annular shoulder 40 and an interior valve seat portion 72 projecting inwardly into said inlet chamber and having, if desired, a circular rim 74 forming a valve seat on the inner end thereof. Said member has an enlarged bore 76 of greater net area than said enlarged stem portion and is preferably provided with the radial passages 78 as shown projecting radially outwardly of said inner end into the outlet chamber 44 of my improved valve. I preferably provide integral with said valve seat portion 70 a hollow elongated gland portion 82 projecting outwardly through said open casing and of slightly less length than said stem portion and preferably having an outer seat portion 84 on the outer end thereof.

As stated, I provide removable means to secure said combination valve seat and gland member and hence valve in assembled position with the valve seat 70 abutting said shoulder 40, in my preferred embodiment comprising the hollow valve nut 48, having the externally threaded inner end 86 for engaging the internally threaded outer end 46 of said bore terminating in an inner end 88 abutting said valve seat portion and a hexagonal or other shaped turning head 90. It is obvious, therefore, that the outer end 92 of the valve stem projects outwardly through the outer end of the gland 82 and I provide means on said gland for sealing the outer end of said stem against leakage. While any means, such as the stuffing-box 94 shown in Fig. 9, or the flexible bellows 96 shown in Fig. 8, may be employed for this purpose, in my preferred embodiment I provide a sealing guide cap 98 having the elongated wall 100 of substantially the length of said gland, covering said hollow gland, and having a gland sealing disc 102 made of suitable flexible sealing material in the outer end of the recess 104 thereof to abut the outer end 92 of said valve stem 66 and said outer gland seat 84, to provide a seal when said cap is urged inwardly to move said valve stem to open position.

The casing 20 has a portion externally threaded at the inner end thereof for insertion within said aligned chamber holes 28 and 30 in the embodiment shown in Figs. 1–9, comprising the inner end 34 of said casing 32 and in the embodiment shown in Figs. 10–16, the inner end of an extension 106 projecting at right angles from said casing 32.

I also provide conduit means leading from said high pressure fluid chamber 22 comprising in the embodiment shown in Figs. 1–11 the radial passages 108 projecting radially inwardly through said casing wall into said inlet chamber 42 and in the embodiment shown in Figs. 10–16, the radial passage-way 110 extending axially downwardly of said extension 106 into said inlet chamber 42 of the valve casing 32, and in both embodiments I provide conduit means leading from the outlet chamber of said cylindrical casing to said low pressure fluid chamber, in the embodiment shown in Figs. 1–9, comprising the three axial conduits 112 extending axially of the casing 32 and discharging through the closed inner end 34 thereof into said low pressure chamber 24, and in the embodiment shown in Figs. 10–16, comprising the single axial conduit 114, extending from said outlet chamber 44 through said extension 106 and discharging in said low pressure chamber 24.

In all embodiments, I provide means to urge said valve stem 57 inwardly to raise the valve disc 58 from its valve seat 72 to pass the fluid from the high pressure fluid chamber 22 to the inlet chamber 42 of said casing 32 and from the outlet chamber 44 of said casing 32 to said low pressure fluid chamber 24. In the embodiment shown in Figs. 1–9 said means include a toggle link 116 pivotally mounted on said valve structure, a toggle link 118 pivotally mounted on said guide cap or end of said stem, having its outer end pivotally attached to the outer end of said first toggle link as at 120, and means to pivot said toggle links inwardly towards the axis of said valve stem, whereby inward movements of said links may move said cap inwardly to increase the sealing pressure on said seal as its links pivot toward the axis of said valve stem. Thus, in the particular embodiments shown in Figs. 1–9, I provide an adjustable collar 124 threadedly adjustable on the outer end of said turning nut interior of the turning head 90, having a bearing 126 mounted thereon tangentially of said nut. I provide the bearing pin 128 mounted within said bearing and the bearing link 116 projecting axially outwardly from said bearing pin, having the link 118 pivotally mounted on the outer end thereof with its opposite end pivotally mounted on said guide cap or valve sealing means employed, whereby pivotal movements of said links may depress said guide cap 98 inwardly to urge said valve stem 57 inwardly to raise the valve disc 58 from its seat to pass said fluid from the high pressure fluid chamber 22 to the inlet chamber 42 of the casing, and from the outlet chamber 44 of said casing 32 to said low pressure fluid chamber 24, bringing the pivot point 120 of said links more into axial alignment with said valve stem 57 to more rapidly increase the pressure of the sealing washer 102 on the valve stem and on the outer seat 84 as said valve is opened.

Figures 6, 7, 8, 9:
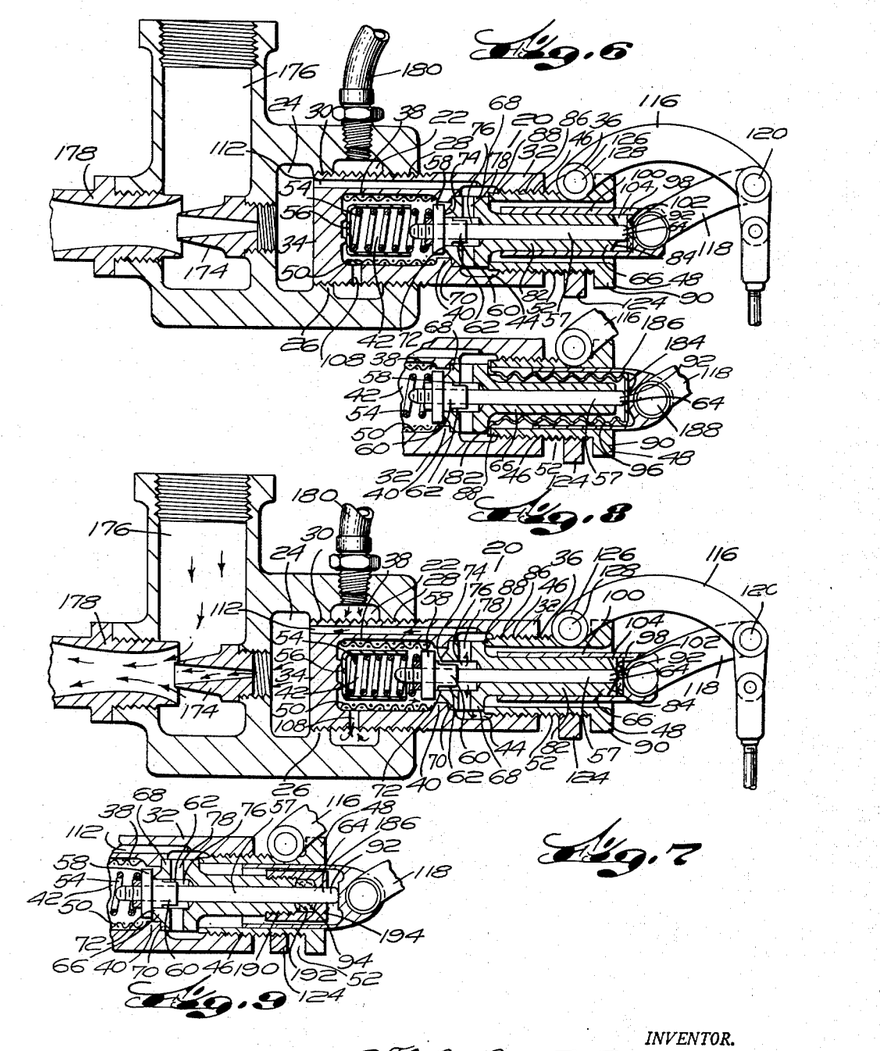
Fig. 6 is a vertical sectional view similar to Fig. 1 of the same valve structure employed as the main actuating portion of a steam suction valve for removing steam from the buck in a garment pressing machine, showing the various parts in closed position.
Fig. 7 is a vertical sectional view similar to Fig. 6, showing the various valve and actuating parts in open position.
Fig. 8 is a vertical sectional view through the outer end of my improved valve structure, showing one modified form of sealing means for the valve and valve stem, comprising a flexible bellows in place of the elongated cap and washer shown in my preferred embodiment in Figs. 1–7.
Fig. 9 is a vertical sectional view through the outer end of my improved valve structure showing another modified form of sealing means for the valve and valve stem comprising a stuffing-box in place of the elongated cap and washer shown in my preferred embodiment in Figs. 1–7.
Figures 10, 11:
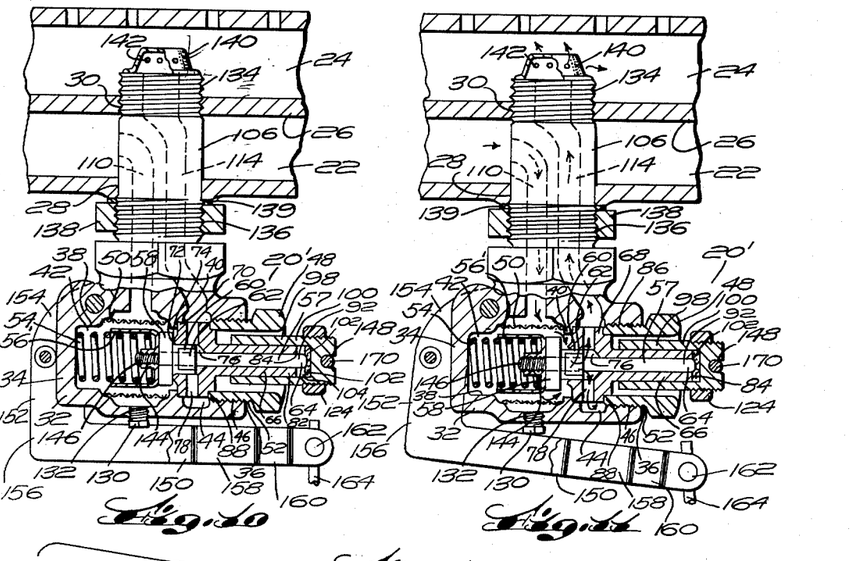
Fig. 10 is a vertical sectional view partially shown in elevation of another embodiment of my improved valve structure, having the cylindrical end of an extension from the casing thereof mounted through aligned holes in the outer wall of the steam heating chamber and the inner partition wall thereof dividing it from the steam spray chamber of the pressing buck of a garment pressing machine so that said extension may be readily screwed into said aligned holes, showing the various parts of the valve structure and operating means in a closed position.
Fig. 11 is a vertical sectional view similar to Fig. 10 of the embodiment shown in Fig. 10, showing the valve parts and operating means in open position.
Figures 12, 13, 14, 15, 16:
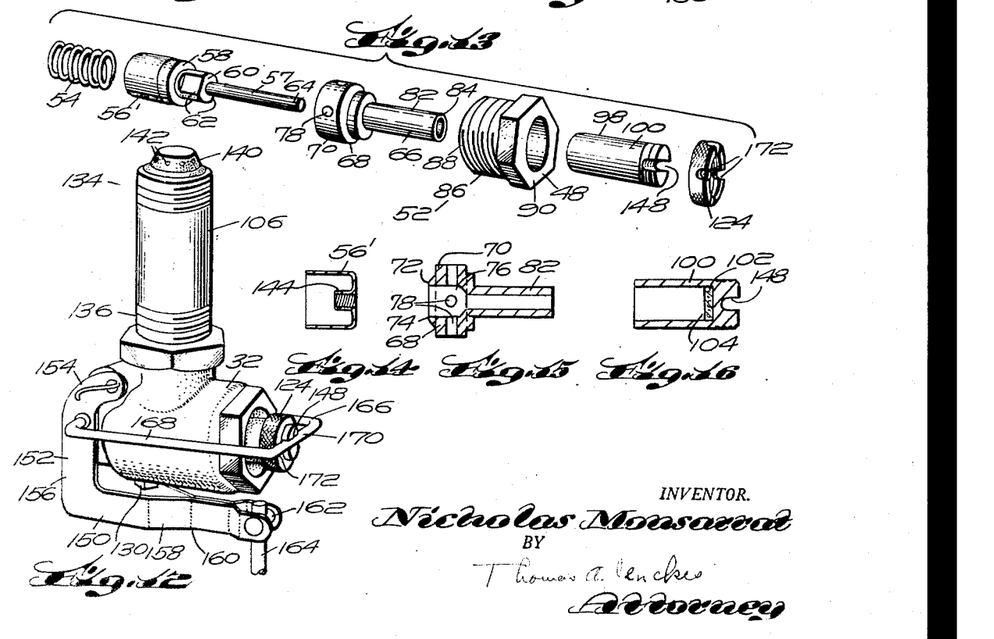
Fig. 12 is a perspective view of the embodiment of my invention shown in Figs. 10 and 11.
Fig. 13 is a disassembled perspective or exploded view of the parts of the valve assembly of the embodiment shown in Figs. 10–12.
Fig. 14 is a vertical sectional view of the spring centering cap of the embodiment shown in Figs. 10–13.
Fig. 15 is a vertical sectional view of the combination valve seat and gland member employed in the embodiment shown in Figs. 10–13.
Fig. 16 is a vertical sectional view of the elongated cap employed in the embodiment shown in Figs. 10–13.

As stated hitherto, if desired, the combination valve seat and gland member 66 may be permanently attached within the shoulder, in which case all parts of the valve stem may not be completely disassembled, but I believe I am the first to provide a valve structure of this type in which a spring actuated seal is provided when in closed position and an opposite flexible seal is provided when in open position, whether said seal comprises the sealing washer 102 on the inner end of the cap 100 or the flexible bellows 96 or stuffing-box 94 as shown in Figs. 8 and 9.

Figures 1, 3:
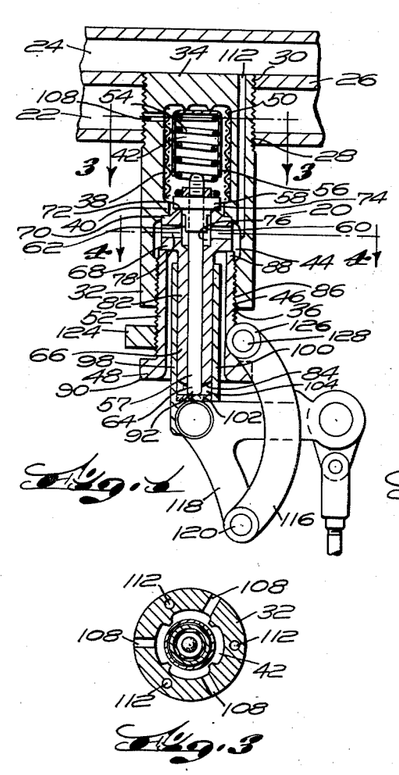
Fig. 1 is a vertical sectional view of my preferred valve structure having the cylindrical end of the casing thereof mounted through aligned holes in the outer wall of the steam heating chamber and the inner partition wall thereof dividing it from the steam spray chamber of a buck of a garment pressing machine, so that said single casing may be readily screwed into said aligned holes, showing the various parts of the valve structure and operating linkage in a closed position.
Fig. 3 is a transverse sectional view taken along the line 3—3 of Fig. 1.
Figures 2, 4:
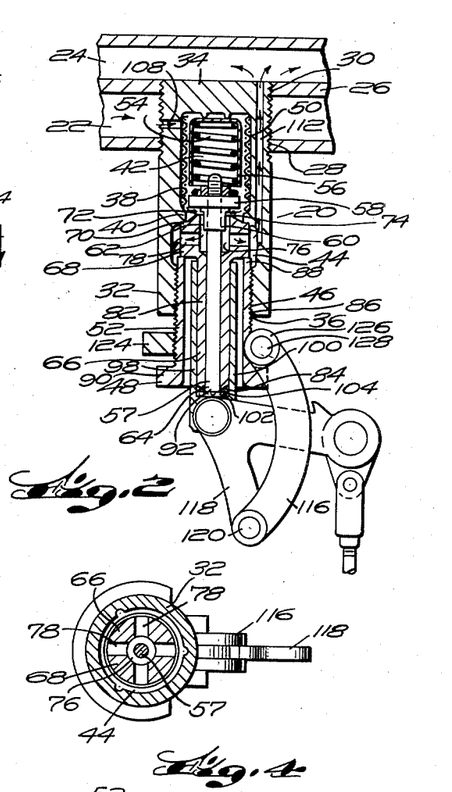
Fig. 2 is a vertical sectional view similar to Fig. 1, showing the valve parts and operating means in open position.
Fig. 4 is a transverse sectional view taken along the line 4—4 of Fig. 1.
Figure 5:
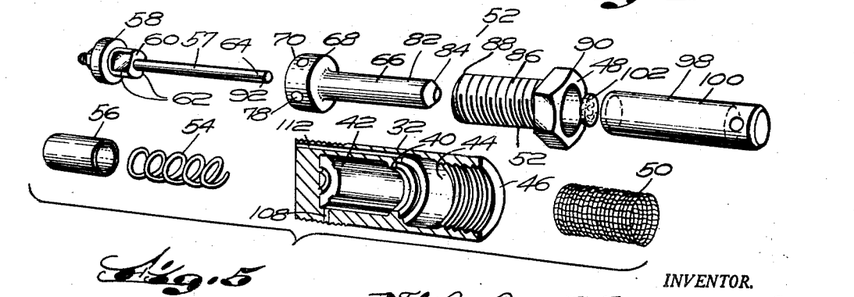
Fig. 5 is a disassembled perspective or exploded view of the various parts of my improved valve structure.

The assembly of my improved valve may be readily observed from the exploded view shown in Fig. 5. The strainer 50 may first be inserted in the casing 32, the protective cap 56 and spring 54 inserted within said inlet chamber 42, the valve stem inserted through said shoulder 40 into said inlet chamber, the combination valve seat and gland member may then be inserted over said valve stem to provide the valve seat 70 substantially separating the inlet chamber 42 from the outlet chamber 44 and the turning nut 48 screwed into position holding all parts in position. Then the flexible washer 102 may be inserted in the cap 98 and inserted over the valve stem and gland and the actuating means may then be suitably mounted in position on the valve. To disassemble, it is obvious that the reverse of these operations is necessary.

It is apparent that any suitable type of means to adjust the seal, cap or valve stem inwardly other than that shown, namely, the mounting of the pivot link 116 on the adjustable collar may be provided.

The embodiment shown in Figs. 10–16 differs in certain particulars from my preferred embodiment shown in Figs. 1–9. I have already described certain of these particulars, namely, the extension 106 having the axial inlet duct 110 and the axial outlet duct 114 therein as shown in said embodiment. The inlet chamber of the valve may be provided with the removable drain plug 130 insertable into a threaded hole 132 in the lower end of said inlet chamber 42.

In the embodiment shown in Figs. 1–9 both the holes 28 and 30 are internally threaded and the inner end 34 of the casing 32 is threaded for a commensurate distance so that the casing 32 may be screwed into both holes.

In the embodiment shown in Figs. 10–16, the inner hole 30 only is threaded and the extension is threaded at its inner and as at 134 and centrally thereof as at 136. The portion which sticks through the hole 28 and the hole 28 itself are not threaded, but a screw nut 138 is provided which may be screwed tightly on said centrally threaded portion 136 until it abuts the lower wall of the high pressure fluid chamber 22 to compactly attach my valve structure thereto in a sealed position abutting the washer 139, abutting said wall.

To cover the outer end of said exhaust duct 114, the inner end of said extension may be provided with a cap 140 having a plurality of small vaporizing and discharge holes 142 therein. In this embodiment the spring centering and protecting cap 56' for said spring means has a central internally threaded hollow boss 144 projecting inwardly thereof and as stated said protecting cap 56' covers the outer end of the spring 54. In this embodiment, the valve stem 57 has the projection 146 projecting from the inner end thereof beyond said sealing disc 58 externally threaded for fitting within said internally threaded boss 144, so that said cap 56' may be removed with said valve stem.

The means to apply pressure to the outer end of the valve stem in this embodiment differs from the means shown in the other embodiment. The outer end of the sealing cap is slotted diametrically as at 148. A lever 150 is pivotally mounted adjacent the inner end 34 of said casing 32, having arms 152 projecting inwardly of said casing 32 as at 154, then downwardly as at 156 and outwardly as at 158 substantially at right angles therefrom and terminating in the common end 160, having connecting means 162 for power applying means 164 thereon. I have provided a U-shaped yoke 166, having arms 168 pivotally mounted substantially centrally of the downwardly projecting portions 156 of the lever arms 150 substantially along the axis of said casing 32 and a transverse portion 170 connecting the ends of said arms 168 together, pivotally contained within diametric adjusting slots 172 normal to each other in the end of said adjusting collar 124 and the slot 148 in said sealing cap, whereby downward pivotal movement of said lever 150 will force the yoke 166 inwardly to urge the valve stem 57 inwardly with rapidly increasing force to provide a snap action valve somewhat similar to the action provided by the toggle links shown in the other embodiment.

As stated hitherto, my improved valve structure, particularly the embodiment shown in Figs. 1-9, may be used in any place where it is desired to connect two adjacent fluid chambers, separated by a partition wall from each other, with the fluid in the high pressure chamber 22 being of sufficient pressure to flow into said low pressure chamber 24.

As shown in Figs. 6 and 7, my improved valve structure is peculiarly adapted for use in a steam suction valve for removing steam by suction from the buck of a garment or laundry pressing machine. Former valves for this purpose, such as the one shown in Pat. No. 2,043,027 aforesaid, comprise a multiplicity of parts and are not readily removable. A comparison of Figs. 6 and 7 with the drawings in said patent will show the superiority of my improved valve structure for use with a suction nozzle 174 to make up such a suction valve. As shown in Figs. 6 and 7, said suction valve comprises a casing having an inlet portion 176 through which the steam from the pressing buck descends and an outlet 178, preferably of a Venturi shape, projecting outwardly at right angles therefrom. When such a valve is modified to include my structure, I provide the high pressure fluid chamber 22 separated from the low pressure fluid chamber 24 by the partition wall 26, and I provide the nozzle 174 extending from said low pressure chamber 24 into the direction of the Venturi shaped outlet 178 so that as my improved valve structure is actuated, steam will flow outwardly through the nozzle to suck and urge air and exhaust steam downwardly through the air inlet 176 and out through the outlet 178. For this purpose, a steam inlet pipe 180 discharges within the high pressure chamber 22 and said high pressure chamber is provided with the threaded hole 28 and the partition wall 26 is provided with the threaded hole 30. The threaded inner end 34 of the casing 32 is threaded through said aligned holes 28 and 30 so that said closed end 34 forms the partition wall of the low pressure chamber 24. It is obvious that as my improved valve is actuated, steam will flow from the high pressure chamber 22 to the low pressure chamber 24 in the manner previously explained, to flow outwardly at the will of the operator through the nozzle 174 to provide suction to discharge steam from the buck through the inlet 176.

As stated hitherto, in place of the sealing cap 98 I may provide the sealing bellows 96 constructed of suitable flexible metallic or other material, having its open inner end 182 suitably secured to the outer surface of the gland valve seat 68 preferably by having the inner end of the turning nut 48 press it against said inner surface. The flexible bellows, therefore, is of cylindrical shape and has its undulating flexible side wall extending outwardly of the gland and valve stem and has the closed outer end 184 covering and abutting said valve stem.

To cover said flexible bellows, I may provide the supplemental cap 186, having the pivot pin 188 mounted thereon for the link 118, the cooperating link 116 being mounted on the collar 124 as usual.

In the stuffing box embodiment shown in Fig. 9, the outer end of the gland portion 82 may be threaded as shown at 190 and have the hollow flexible washer 192 abutting the outer end thereof, so that the valve stem 57 may slide through it. The hollow washer 192 is retained in the outer end of the gland by an additional cap 194 abutting the outer end of the washer, having an internally threaded inner end for engaging the threaded outer end 190 of said gland. To provide means to mount the inner end of the link 118 thereon, I provide a similar cap 186 to that shown in Fig. 8, having a flat inner end and adapted to abut the inner end 92 of the valve stem 64 and its wall interposed between the wall of the turning nut 48 and outer wall of the cap 194.

In all embodiments, it is obvious that moving of the collar nut 124 on the shank 86 will rotate the link structure relative to said turning nut and provide adjustability between the actuating means and the end 92 of the valve stem.

It is apparent that I have provided a novel type of valve structure particularly adapted for use in pressing machines, with the advantages described above.

It is understood that my invention is not limited to the specific embodiments shown and that various deviations may be made therefrom without departing from the spirit and scope of the appended claims.

What I claim is:

1. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, and having an internally threaded outer end, a cylindrical perforated strainer in said inlet chamber, a valve assembly insertable and removable through said open outer end, comprising spring means abutting said inner end, a spring centering and protecting cap overlying said spring means, a valve disc abutting said spring means having an integral valve stem having a centrally enlarged portion having flattened edges slidable through said center shoulder and a stem portion extending outwardly through the open outer end of said casing, a hollow combination gland and valve seat member having an inner end having an exterior sealing portion abutting said annular shoulder, and an interior valve seat portion in said inlet chamber having a circular rim forming a valve seat on the inner end thereof, and an enlarged bore of greater net area than said enlarged stem portion, having radial passages discharging in said outlet chamber and a hollow elongated gland portion containing said stem projecting outwardly through said open casing end and having an outer seat portion on the end thereof, a hollow valve nut having a threaded portion for engaging the internally threaded outer end of said chamber bore terminating in an inner end abutting said valve seat portion and a turning head, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disk from its seat to pass said fluid from the high pressure fluid chamber to the inlet chamber of said casing and from said outlet chamber of said casing to said low pressure fluid chamber.

2. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem, having radial passages discharging in said outlet chamber and a hollow elongated gland portion containing said stem projecting outwardly through said open casing end and having an outer seat portion on the end thereof, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber, including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disk from its seat to pass said fluid from the high pressure fluid chamber to the inlet chamber of said casing and from said outlet chamber of said casing to said low pressure fluid chamber.

3. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, a cylindrical perforated strainer in said inlet chamber, spring means abutting said inner end, a valve disk abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem, having radial passages discharging said outlet chamber and a hollow elongated gland portion containing said stem projecting outwardly through said open casing end and having an outer seat portion on the end thereof, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disk from its seat to pass said fluid from the high pressure fluid chamber to the inlet chamber of said casing and from said outlet chamber of said casing to said low pressure fluid chamber.

4. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a spring centering and protecting cap overlying said spring means, a valve disk abutting said spring means, a valve stem slidable through said center shoulder and extending outwardly through the open outer end of said casing, a hollow combination gland and valve seat member having an inner end having an exterior sealing portion secured to said annular shoulder, an interior valve seat portion in said inlet chamber, and an enlarged bore of greater net area than said stem, having radial passage discharging in said outlet chamber and a hollow elongated gland portion containing said stem projecting outwardly through said open casing end and having an outer seat portion on the end thereof, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber, including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disc from its seat to pass said fluid from the high pressure fluid chamber to the inlet chamber of said casing and from said outlet chamber of said casing to said low pressure fluid chamber.

5. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, and having an internally threaded outer end, a valve assembly insertable and removable through said open outer end, comprising spring means abutting said inner end, a valve disc abutting said spring means, having an integral stem slidable through said center shoulder and extending outwardly through the open outer end of said casing, a hollow combination gland and valve seat member having an inner end having an exterior sealing portion abutting said annular shoulder, and an interior valve seat portion in said inlet chamber, and an enlarged bore of greater net area than said stem, having radial passages discharging in said outlet chamber and a hollow elongated gland portion containing said stem projecting outwardly through said open casing end having an outer seat portion on the end thereof, a hollow valve nut having a threaded portion for engaging the internally threaded outer end of said chamber bore terminating in an inner end abutting said valve seat portion and a turning head, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disk from its seat to pass said fluid from the high pressure fluid chamber to the inlet chamber of said casing and from said outlet chamber of said casing to said low pressure fluid chamber.

6. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, a valve assembly insertable and removable through said open outer end, comprising spring means abutting said inner end, a valve disk abutting said spring means, having an integral valve stem slidable through said center shoulder and extending outwardly through the open outer end of said casing, a hollow combination gland and valve seat member having an inner end having an exterior sealing portion abutting said annular shoulder, and an interior valve seat portion in said inlet chamber, and an enlarged bore of greater net area than said stem, having radial passages discharging in said outlet chamber and a hollow elongated gland portion containing said stem projecting outwardly through said open casing end and having an outer seat portion on the end thereof, removable means to secure said gland member in position against said shoulder, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disk from its seat to pass said fluid from the high pressure fluid chamber to the inlet chamber of said casing and from said outlet chamber of said casing to said low pressure fluid chamber.

7. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem, having radial passages discharging in said outlet chamber and a hollow elongated gland portion containing said stem projecting outwardly through said open casing end and having an outer seat portion on the end thereof, a sealing guide cap having an elongated wall covering said hollow gland having a gland sealing disk in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber, a toggle link pivotally mounted on said valve structure, a toggle link pivotally mounted on said guide cap, having its outer end pivotally attached to the outer end of said first toggle link and means to pivot said toggle links inwardly, whereby increased pivotal movements of said links may move said cap inwardly to increase the sealing pressure on said seal as the links pivot towards the axis of said valve stem.

8. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disk abutting said spring means, a valve stem slidable through said central shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem portion, having radial passages discharging in said outlet chamber and a hollow elongated gland portion containing said stem projecting outwardly through said open casing, said casing having a portion externally threaded at the inner end thereof for insertion within said chamber holes and conduit means leading from said high pressure fluid chamber, including a portion extending radially inwardly of said cylindrical valve casing into the inlet chamber thereof and conduit means leading from said outlet chamber of said cylindrical casing to said low pressure fluid chamber and means to urge said valve stem inwardly to raise the valve disc from its seat to pass said fluid from the high pressure fluid chamber to the inlet chamber of said casing and from said outlet chamber of said casing to said low pressure fluid chamber.

9. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem, having radial passages discharging in said outlet chamber and a hollow elongated gland portion containing said stem projecting outwardly through said open casing end and means on said gland member for sealing the outer end of the stem, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to urge said valve stem inwardly to raise the valve disk from its seat to pass said fluid from the high pressure fluid chamber to the inlet chamber of said casing and from said outlet chamber of said casing to said low pressure fluid chamber.

10. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem portion, having radial passages discharging in said outlet chamber and a hollow elongated gland portion containing said stem projecting outwardly though said open casing end and stuffing box means for sealing the outer end of the valve stem mounted on the outer end of the gland member, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to urge said valve stem inwardly to raise the valve disc from its seat to pass said fluid from the high pressure fluid chamber to the inlet chamber of said casing and from said outlet chamber of said casing to said low pressure fluid chamber.

11. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem portion, having radial passages discharging in said outlet chamber and a hollow elongated gland portion containing said stem projecting outwardly through said open casing end and flexible bellows means for sealing said valve stem, having its outer end covering the outer end of the valve stem and having its inner end mounted on the inner end of said gland member, said casing having a portion externally threaded at the inner end thereof for insertion within said chamber holes and conduit means leading from said high pressure fluid chamber including a portion extending radially inwardly of said cylindical valve casing into the inlet chamber thereof and conduit means leading from said outlet chamber of said cylindrical casing to said low pressure fluid chamber and means to urge said valve stem inwardly to raise the valve disc from its seat to pass said fluid from the high pressure fluid chamber to the inlet chamber of said casing and from said outlet chamber of said casing to said low pressure fluid chamber.

12. A valve structure for connecting two adjacent fluid chambers separated by a partition wall from each other with the fluid in the high pressure chamber being under sufficient pressure to flow into said low pressure chamber, said high pressure chamber having a hole in its outer wall aligned with a threaded hole in the partition wall, comprising a hollow valve casing having a closed cylindrical inner end and an open outer end, and a central bore constricted substantially centrally thereof to provide a central annular shoulder, providing an inlet chamber between said shoulder and said closed inner end thereof and an outlet chamber between said shoulder and said open outer end, and having an internally threaded outer end, a cylindrical perforated strainer in said inlet chamber, a valve assembly insertable and removable through said open outer end, comprising spring means abutting said inner end, a spring centering and protecting cap overlying said spring means, a valve disc abutting said spring means having an integral valve stem having a centrally enlarged portion having flattened edges slidable through said center shoulder and a stem portion extending outwardly through the open outer end of said casing, a hollow combination gland and valve seat member having an inner end having an exterior sealing portion abutting said annular shoulder and an interior valve seat portion having a circular rim forming a valve seat on the inner end thereof, and an enlarged bore of greater net area than said enlarged stem portion having radial passages discharging in said outlet chamber and a hollow elongated gland portion containing said stem projecting outwardly through said open casing end, having an outer seat portion on the end thereof, a hollow valve nut having a threaded portion for engaging the internally threaded outer end of said bore terminating in an inner end abutting said valve seat portion and a turning head, a sealing guide cap having an elongated wall covering said hollow gland, having a gland sealing disc in the outer end of the recess thereof to abut said valve stem and said outer gland seat when in open position, said casing being externally threaded at the inner end thereof for insertion within said chamber holes and having inlet hole means extending radially inwardly of said valve casing from said high pressure chamber into the inlet chamber of said valve casing and passage way means extending from the outlet chamber of said casing axially outwardly of said casing and discharging through the inner end of said casing into said low pressure chamber, and internally threaded collar adjustably mounted on the threaded periphery of said valve nut intermediate the end of said casing and the turning head of said nut having a bearing mounted thereon tangentially of said nut, a bearing pin mounted within said bearing and a bearing link projecting axially outwardly from said bearing pin, having a link pivotally mounted on the outer end thereof with its opposite end pivotally mounted on said guide cap, whereby pivotal movement of said links may depress said guide cap inwardly to urge said valve stem inwardly to raise the valve disc from its seat to pass said fluid from the high pressure fluid chamber to the inlet chamber of said casing and from the outlet chamber of said casing to said low pressure fluid chamber, bringing the pivot point of said links more into axial alignment with said valve stem to more rapidly increase the pressure on the valve stem and on the outer seat as the valve is opened.

13. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow valve casing having a closed cylindrical inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem slidable through said center shoulder and extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said stem having radial passages discharging in said outlet chamber and a hollow elongated gland portion containing said stem projecting outwardly through said open casing end and having an outer seat portion on the end thereof, a sealing guide cap having an elongated wall covering said hollow gland having a gland sealing disc in the outer end of the recess thereof to abut said valve stem and said outer gland seat when in open position, said casing being externally threaded at the inner end thereof for insertion within said chamber holes and having inlet hole means extending radially inwardly of said valve casing from said high pressure chamber into the inlet chamber of said valve casing and passage way means extending from the outlet chamber of said casing axially outwardly of said casing and discharging into said low pressure chamber, a bearing mounted tangentially on said casing, a bearing pin mounted within said bearing and a bearing link projecting axially outwardly from said bearing pin having a link pivotally mounted on the outer end thereof with its opposite end pivotally mounted on said guide cap, whereby pivotal movement of said links may depress said guide cap inwardly to urge said valve stem inwardly to raise the valve disc from its seat to pass said fluid from the high pressure fluid chamber to the inlet chamber of said casing and from the outlet chamber of said casing to said low pressure fluid chamber, bringing the pivot point of said links more into axial alignment with said valve stem to more rapidly increase the pressure on the valve stem and on the outer seat as the valve is opened.

14. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow valve casing having a closed cylindrical inner end and an open outer end, and a central bore constricted substantially centrally thereof to provide a central annular shoulder, providing an inlet chamber between said shoulder and said closed inner end thereof and an outlet chamber between said shoulder and said open outer end, and having an internally threaded outer end, a valve assembly insertable and removable through said open outer end, comprising spring means abutting said inner end, a valve disc abutting said spring means, having an integral valve stem slidable through said center shoulder and extending outwardly through the open outer end of said casing, a hollow combination gland and valve seat member having an inner end having an exterior sealing portion abutting said annular shoulder and an interior valve seat portion in said inlet portion and an enlarged bore of greater net area than said stem portion, having radial passages discharging in said outlet chamber and a hollow elongated gland portion containing said stem projecting outwardly through said open casing end, and having an outer seat portion on the end thereof, a hollow valve nut having a threaded portion for engaging the internally threaded outer end of said bore terminating in an inner end abutting said valve seat portion and a turning head, a sealing guide cap having an elongated wall covering said hollow gland having a gland sealing disc in the outer end of the recess thereof to abut said valve stem and said outer gland seat when in open position, said casing being externally threaded at the inner end thereof for insertion within said chamber holes and having inlet hole means extending radially inwardly of said valve casing from said high pressure chamber into the inlet chamber of said valve casing and passage way means extending from the outlet chamber of said casing axially outwardly of said casing and discharging into said low pressure chamber, an internally threaded collar adjustably mounted on the threaded periphery of said valve nut intermediate the end of said casing and the turning head of said nut having a bearing mounted thereon tangentially of said nut, a bearing pin mounted within said bearing and a bearing link projecting axially outwardly from said bearing pin, having a link pivotally mounted on the outer end thereof with its opposite end pivotally mounted on said guide cap, whereby pivotal movement of said links may depress said guide cap inwardly to urge said valve stem inwardly to raise the valve disc from its seat to pass said fluid from the high pressure fluid chamber to the inlet chamber of said casing and from the outlet chamber of said casing to said low pressure fluid chamber, bringing the pivot point of said links more into axial alignment with said valve stem to more rapidly increase the pressure on the valve stem and on the outer seat as the valve is opened.

15. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow valve casing having a closed cylindrical inner end and an open outer end, and a central bore constricted substantially centrally thereof to provide a central annular shoulder, providing an inlet chamber between said shoulder and said closed inner end thereof and an outlet chamber between said shoulder and said open outer end, a valve assembly insertable and removable through said open outer end comprising spring means abutting said inner end, a valve disc abutting said spring means having an integral valve stem slidable through said center shoulder and extending outwardly through the open outer end of said casing, a hollow combination gland and valve seat member having an inner end having an exterior sealing portion abutting said annular shoulder and an interior valve seat portion in said inlet portion, and an enlarged bore of greater net area than said stem, having radial passages discharging in said outlet chamber and a hollow elongated gland portion containing said stem projecting outwardly through said open casing end and having an outer seat portion on the end thereof, removable means to secure said member in position against said shoulder, a sealing guide cap having an elongated wall covering said hollow gland, having a gland sealing disc in the outer end of the recess thereof to abut said valve stem and said outer gland seat when in open position, said casing being externally threaded at the inner end thereof for insertion within said chamber holes and having inlet hole means extending radially inwardly of said valve casing from said high pressure chamber into the inlet chamber of said valve casing and passage way means extending from the outlet chamber of said casing axially outwardly of said casing and discharging into said low pressure chamber, an internally threaded collar adjustably mounted on the threaded periphery of said valve nut intermediate the end of said casing and the turning head of said nut having a bearing mounted thereon tangentially of said nut, a bearing pin mounted within said bearing and a bearing link projecting axially outwardly from said bearing pin having a link pivotally mounted on the outer end thereof with its opposite end pivotally mounted on said guide cap, whereby pivotal movement of said links may depress said guide cap inwardly to urge said valve stem inwardly to raise the valve disc from its seat to pass said fluid from the high pressure fluid chamber to the inlet chamber of said casing and from the outlet chamber of said casing to said low pressure fluid chamber, bringing the pivot point of said links more into axial alignment with said valve stem to more rapidly increase the pressure on the valve stem and on the outer seat as the valve is opened.

16. A steaming valve for connecting the steam heating chamber to the steam spray chamber of a pressing member of a garment pressing machine having aligned holes therein, comprising a hollow valve casing having a closed inner end and an open outer end, a drain plug therein, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom substantially at right angles substantially centrally thereof for insertion within said pressing member holes threaded substantially centrally thereof and at the end thereof and having a steam heating chamber inlet duct extending from intermediate said threaded portions to said enlarged annular inlet chamber and a steam exhaust chamber outlet duct extending from said enlarged annular outlet chamber to the end thereof, a cap over the end of said outlet duct having a plurality of small vaporizing and discharge holes therein, a cylindrical perforated strainer in said enlarged inlet chamber, a valve assembly insertable and removable through said open outer end, comprising spring means abutting said closed end, a spring centering and protecting cap for said spring means, having a central internally threaded hollow boss projecting inwardly thereof, a valve disc abutting said cap, and a valve stem having an inner end extending within said inlet chamber having a threaded tip secured within said boss, a centrally enlarged portion having flattened edges slidable through said center shoulder and a stem portion extending outwardly through the open outer end of said casing, a hollow combination gland and valve seat member having an inlet end having an exterior sealing portion abutting said annular shoulder and an interior valve seat portion in said inner chamber having a circular rim forming a valve seat on the inner end thereof, having an enlarged bore of greater net area than said enlarged stem portion having radial passages discharging in said outlet chamber and a hollow gland portion containing said stem portion projecting outwardly through said open casing end, having an outer seat portion on the end thereof, a hollow valve nut having a threaded portion for engaging the internally threaded outer end of said bore terminating in an inner end abutting said valve seat portion and a turning head, a sealing guide cap having an elongated wall covering said hollow gland externally threaded near the outer end thereof, having a gland sealing disc in the outer end of the recess thereof to abut said valve stem and gland end seat when in open position, having a slotted outer end, and a slotted adjusting collar threaded on said gland, a lever pivotally mounted adjacent the inner end of said casing, having arms projecting inwardly beyond said casing and then downwardly and then outwardly substantially at right angles therefrom and terminating in a common end, having connecting means for power applying means thereon, and a yoke link having arms pivotally mounted substantially centrally of the downwardly projecting portions of the lever arms substantially along the axis of said casing and a transverse portion connecting the ends of each arm pivotally contained within the aligned adjusting slots in said adjusting collar and cap whereby downward pivotal movement of said lever will force the yoke inwardly to urge the valve stem inwardly with rapidly increasing force to provide a snap action valve.

17. A steaming valve for connecting the steam heating chamber to the steam spray chamber of a pressing member of a garment pressing machine having aligned holes therein, comprising a hollow valve casing having a closed inner end and an open outer end, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom for insertion within said pressing member holes having a steam heating chamber inlet duct extending to said enlarged annular inlet chamber and a steam exhaust chamber outlet duct extending from said enlarged annular outlet chamber, a valve assembly insertable and removable through said open outer end, comprising spring means abutting said closed end, a disc valve abutting said spring means, having a valve stem slidable through said center shoulder and extending outwardly through the open outer end of said casing, a hollow combination gland and valve seat member having an inner end having an exterior sealing portion abutting said annular shoulder and an interior valve seat portion in said inlet chamber, having an enlarged bore of greater net area than said stem portion having radial passages discharging in said outlet chamber and a hollow gland portion containing said stem projecting outwardly through said open casing end, a hollow valve nut having a threaded portion for engaging the internally threaded outer end of said bore terminating in an inner end abutting said valve seat portion and a turning head, a sealing guide cap covering said hollow gland having a gland sealing disc in the outer end of the recess thereof to abut said valve stem and gland end when in open position, a lever pivotally mounted on said casing having connecting means for power applying means thereon, and a yoke link having arms pivotally mounted substantially along the axis of said casing and a transverse portion connecting the ends of each arm contacting said cap whereby downward pivotal movement of said lever will force the yoke inwardly to urge the valve stem inwardly with rapidly increasing force to provide a snap action valve.

18. A steaming valve for connecting the steam heating chamber to the steam spray chamber of a pressing member of a garment pressing machine having aligned holes therein, comprising a hollow valve casing having a closed inner end and an open outer end, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom for insertion within said pressing member holes having a steam heating chamber inlet duct extending to said enlarged annular inlet chamber and a steam exhaust chamber outlet duct extending from said enlarged annular outlet chamber, spring means abutting said closed end, a disc valve abutting said spring means, a valve stem slidable through said center shoulder and extending outwardly through the open outer end of said casing, a hollow combination gland and valve seat member having an inner end having an exterior sealing portion secured to said annular shoulder and an interior valve seat portion in said inlet chamber having an enlarged bore of greater net area than said stem, having radial passages discharging in said outlet chamber and a hollow gland portion containing said stem projecting outwardly through said open casing end, means on said gland member for sealing the outer end of the valve stem and means to urge said valve stem inwardly to raise the valve disc from its seat to pass said fluid from the steam heating chamber to the inlet chamber of said casing and from said outlet chamber of said casing to said steam spray chamber.

19. A steaming valve for connecting the steam heating chamber to the steam spray chamber of a pressing member of a garment pressing machine having aligned holes therein, comprising a hollow valve casing having a closed inner end and an open outer end, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom for insertion within said pressing member holes, having a steam heating chamber inlet duct extending to said enlarged annular inlet chamber and a steam exhaust chamber outlet duct extending from said enlarged annular outlet chamber, a valve assembly insertable and removable from said open outer end, comprising spring means abutting said closed end, a disc valve abutting said spring means, having a valve stem slidable through said center shoulder and extending outwardly through the open outer end of said casing, a hollow combination gland and valve seat member having an inner end having an exterior sealing portion secured to said annular shoulder and an interior valve portion in said inlet chamber, having an enlarged bore of greater net area than said stem, having radial passages discharging in said outlet chamber and a hollow gland portion containing said stem projecting outwardly through said open casing end, a hollow valve nut having a threaded portion for engaging the internally threaded outer end of said bore terminating in an inner end abutting said valve seat portion and a turning head, means on said gland member for sealing the outer end of the valve stem and means to urge said valve stem inwardly to raise the valve disc from its seat to pass said fluid from the steam heating chamber to the inlet chamber of said casing and from said outlet chamber of said casing to said steam spray chamber.

20. A steaming valve for connecting the steam heating chamber to the steam spray chamber of a pressing member of a garment pressing machine having aligned holes therein, comprising a hollow valve casing having a closed inner end and an open outer end, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom for insertion within said pressing member holes having a steam heating chamber inlet duct extending to said enlarged annular inlet chamber and a steam exhaust chamber outlet duct extending from said enlarged annular outlet chamber, a valve assembly insertable and removable through said open outer end, comprising spring means abutting said closed end, a disc valve abutting said spring means, having a valve stem slidable through said center shoulder and extending outwardly through the open outer end of said casing, a hollow combination gland and valve seat member having an inner end having an exterior sealing portion abutting said annular shoulder and an interior valve portion in said inlet chamber, having an enlarged bore of greater net area than said stem, having radial passages discharging in said outlet chamber and a hollow gland portion containing said stem projecting outwardly through said open casing end, removable means to secure said member in position against said shoulder, means on said gland member for sealing the outer end of the valve stem and means to urge said valve stem inwardly to raise the valve disc from its seat to pass said fluid from the steam heating chamber to the inlet chamber of said casing and from said outlet chamber of said casing to said steam spray chamber.

21. A steaming valve for connecting the steam heating chamber to the steam spray chamber of a pressing member of a garment pressing machine having aligned holes therein, comprising a hollow valve casing having a closed inner end and an open outer end, and a central bore constricted substantially centrally thereof to provide a central annular shoulder, and being enlarged to provide an annular inlet chamber between said shoulder and said closed inner end thereof and also enlarged to provide an annular outlet chamber between said shoulder and said open outer end, and having an internally threaded outer end, said casing having a cylindrical extension projecting therefrom for insertion within said pressing member holes having a steam heating chamber inlet duct extending to said enlarged annular inlet chamber and a steam exhaust chamber outlet duct extending from said enlarged annular outlet chamber, spring means abutting said closed end, a disc valve abutting said spring means, a valve stem slidable through said center shoulder and extending outwardly through the open outer end of said casing, a hollow combination gland and valve seat member having an inner end having an exterior sealing portion secured to said annular shoulder and an interior valve portion in said inlet chamber, having an enlarged bore of greater net area than said stem, having radial passages discharging in said outlet chamber and a hollow gland portion containing said stem projecting outwardly through said open casing end, and having an outer seat portion on the end thereof, a sealing guide cap covering said hollow gland having a gland sealing disc in the outer end of the recess thereof to abut said valve stem and gland end when in open position and means to depress the outer end of said guide cap to urge said valve stem inwardly to raise the valve disc from its seat to pass said fluid from the steam heating chamber to the inlet chamber of said casing and from said outlet chamber of said casing to said steam spray chamber.

22. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem having a centrally enlarged portion slidable through said center shoulder and a stem portion extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said enlarged stem portion, having radial passages discharging in said outlet chamber and a hollow elongated gland portion containing said stem projecting outwardly through said open casing end and having an outer seat portion on the end thereof, a sealing guide cap having an elongated wall covering said hollow gland having a gland sealing disc in the outer end of the recess thereof to abut said valve stem and said outer gland seat when in open position, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to depress the outer end of said guide cap to urge said valve stem inwardly to raise the valve disc from its seat to pass said fluid from the high pressure fluid chamber to the inlet chamber of said casing and from said outlet chamber of said casing to said low pressure fluid chamber.

23. A valve structure for connecting two adjacent fluid chambers separated by a partition wall from each other with the fluid in the high pressure chamber being under sufficient pressure to flow into said low pressure chamber, one of said chambers having a hole in its outer wall aligned with a threaded hole in the partition wall, comprising a hollow cylindrical valve casing having a closed inner end and an open outer end, and a central bore constricted substantially centrally thereof to provide a central annular shoulder, providing an inlet chamber between said shoulder and said closed inner end thereof and an outlet chamber between said shoulder and said open outer end, spring means abutting said inner end, a valve disc abutting said spring means, a valve stem having a centrally enlarged portion slidable through said center shoulder and a stem portion extending outwardly through the open outer end of said casing, a hollow combination gland and valve seat member having an inner end having an exterior sealing portion secured to said annular shoulder, and an interior valve seat portion in said inlet chamber, and an enlarged bore of greater net area than said enlarged stem portion, having radial passages discharging in said outlet chamber and a hollow elongated gland portion containing said stem projecting outwardly through said open casing end and means on said gland member for sealing the outer end of the stem, said casing having a portion externally threaded at the inner end thereof for insertion within said chamber holes and conduit means leading from said high pressure fluid chamber including a portion extending radially inwardly of said cylindrical valve casing into the inlet chamber thereof and conduit means leading from said outlet chamber of said cylindrical casing to said low pressure fluid chamber and means to urge said valve stem inwardly to raise the valve disc from its seat to pass said fluid from the high pressure fluid chamber to the inlet chamber of said casing and from said outlet chamber of said casing to said low pressure fluid chamber.

NICHOLAS MONSARRAT.

REFERENCES CITED

The following references are of record in the file of this patent:

UNITED STATES PATENTS

| Number | Name | Date |
|---|---|---|
| 1,671,178 | Cohen | May 29, 1928 |
| 1,671,179 | Beede | May 29, 1928 |
| 2,210,616 | Clarke | Aug. 6, 1940 |